(12) United States Patent
Nakagiri

(10) Patent No.: US 6,493,099 B2
(45) Date of Patent: Dec. 10, 2002

(54) PRINT CONTROL APPARATUS AND METHOD

(75) Inventor: Koji Nakagiri, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,474

(22) Filed: Oct. 30, 1998

(65) Prior Publication Data

US 2002/0063878 A1 May 30, 2002

(30) Foreign Application Priority Data

Nov. 4, 1997 (JP) .......................................... 09-301995

(51) Int. Cl.[7] .............................................. G06F 15/00
(52) U.S. Cl. ...................... 358/1.13; 358/1.1; 382/112; 382/277
(58) Field of Search .................... 358/1.1, 1.11, 358/1.13, 1.14, 1.15, 1.18, 448, 452, 1.16, 1.17, 444; 382/112, 277, 286

(56) References Cited

U.S. PATENT DOCUMENTS 4,933,772 A * 6/1990 Ikenoue et al. ............. 358/434
5,566,245 A * 10/1996 Zheng et al. ................ 382/112

* cited by examiner

Primary Examiner—Edward Coles
Assistant Examiner—Mark Wallerson
(74) Attorney, Agent, or Firm—Fitzpatrick, Cella, Harper & Scinto

(57) ABSTRACT

A print control apparatus and method executes print processing in a minimum time by utilizing a maximum of resources for printing because an optimal print mode can automatically be set for each page or each job regardless of the print mode set by a user. In one embodiment, a print apparatus for transforming graphics commands from an application into print control commands is provided. The apparatus includes an acquisition unit for acquiring transformation-time coefficient data; a computation unit for computing transformation periods in units of pages; a selecting unit for selecting one print mode for each page which has the least transformation period by comparing the transformation periods; a determination unit for determining whether the selected one print mode for each page is identical to a set print mode; and a changing unit for changing the set print mode into the selected one print mode.

34 Claims, 12 Drawing Sheets

FIG. 7A

DATA TO BE ACQUIRED : (PRINT MODE, PROCESSING-TIME COEFFICIENT DATA 1, PROCESSING-TIME COEFFICIENT DATA 2 ···, PROCESSING-TIME COEFFICIENT DATA N)

- WHEN (PRINT MODE) = (VECTOR GRAPHICS PRINT MODE),
  (PROCESSING-TIME COEFFICIENT DATA k) = (OBJECT k, PROCESSING-TIME COEFFICIENT k)

- WHEN (PRINT MODE) = (RASTER GRAPHICS PRINT MODE),
  (PROCESSING-TIME COEFFICIENT DATA l) = (PAPER SIZE l, PROCESSING-TIME COEFFICIENT l)

FIG. 7B

- (PRINT MODE) = CASE OF (VECTOR GRAPHICS PRINT MODE)
  (VectorMode, (Text, a), (Circle, b), (Bitmap, c), ···, (Line, n))

- (PRINT MODE) = CASE OF (RASTER GRAPHICS) WHEN (PRINT MODE) = (RASTER GRAPHICS PRINT MODE),
  (RasterMode, (A4, a), (A5, b), ···, (Letter, n))

FIG. 9

[ VECTOR-GRAPHICS PRINT MODE ]
(PROCESSING TIME FOR OBJECT N)
= (PROCESSING-TIME COEFFICIENT ASSIGNED FOR OBJECT N) × (NUMBER OF OBJECTS INCLUDED IN PAGE)

(PROCESSING TIME FOR PAGE P)
= Σ (PROCESSING TIME FOR EACH OBJECT)

[ RASTER-GRAPHICS PRINT MODE ]
(PROCESSING TIME FOR PAGE P)
= (PROCESSING-TIME COEFFICIENT ASSIGNED FOR PAPER SIZE OF PAGE P)

FIG. 13

STORAGE MEDIUM SUCH AS FD OR CD-ROM

| DIRECTORY INFORMATION |
|---|
| 1ST DATA-PROCESSING PROGRAM<br>PROGRAM CODES CORRESPONDING TO FLOWCHART SHOWN IN FIG. 4 |
| 2ND DATA-PROCESSING PROGRAM<br>PROGRAM CODES CORRESPONDING TO FLOWCHART SHOWN IN FIG. 5 |
| 3RD DATA-PROCESSING PROGRAM<br>PROGRAM CODES CORRESPONDING TO FLOWCHART SHOWN IN FIG. 8 |
| 4TH DATA-PROCESSING PROGRAM<br>PROGRAM CODES CORRESPONDING TO FLOWCHART SHOWN IN FIG. 10 |
| 5TH DATA-PROCESSING PROGRAM<br>PROGRAM CODES CORRESPONDING TO FLOWCHART SHOWN IN FIG. 11 |
| |

MEMORY MAP OF STORAGE MEDIUM

PRINT CONTROL APPARATUS AND METHOD

BACKGROUND OF THE INVENTION

1. Field of the Invention

The present invention relates to print control apparatuses and methods that transfer print information based on print modes automatically set in accordance with rendering commands from an application, and storage media containing machine-readable programs therefor.

2. Description of the Related Art

In print processing by a printer for a data processor provided with a conventional print control apparatus, concerning print-mode selection for printing, there is currently only a method of using a print mode selected on a print-setting screen by a user, even if the printer has a plurality of print modes such as a page-description-language (PDL) mode and an image mode.

The print mode selected by the user is applied to the processing of all pages included in a print job. Thus, all the pages are processed in the same print mode.

As described above, in conventional processing by a printer, there is only a method of using a print mode selected by a user, even if the printer has other optional print modes such as a PDL mode and an image mode. Accordingly, printing is executed without consideration of the optimal print mode for printing throughput and print data for the printer, which causes a problem in that printing throughput deteriorates if the user has not selected a print mode adapted for the print data.

In addition, the application of the print mode selected by the user to all the pages included in the print job causes problems in that some pages are not processed in the optimal print mode, and if a print mode adapted for each page was not selected, printing throughput deteriorates.

SUMMARY OF THE INVENTION

Accordingly, the present invention has been made in order to solve the foregoing problems, and it is an object thereof to provide a print control apparatus and method, and a machine-readable storage medium containing programs therefor in which the rendering-processing time necessary for each page is computed for each print mode, and a print mode having the least processing time is set, whereby an optimal print mode for each page can be set automatically regardless of the print mode set by a user, and print processing that utilizes a maximum of printing resources can be executed in a minimum time to significantly increase printing throughput.

To this end, according to a first aspect of the present invention, the foregoing object has been achieved through provision of a print control apparatus for transforming, in accordance with different print modes, graphics commands from an application into print control commands to be analyzed by a printer before transferring the print control commands via a predetermined communication medium, the print control apparatus comprising: acquisition means for acquiring transformation-time coefficient data for the print modes; computation means for computing in units of pages, based on the transformation-time coefficient data acquired by the acquisition means, transformation periods for transforming the graphics commands from the application; selecting means for selecting one print mode for each page which has the least transformation period by comparing the transformation periods for the print modes computed by the computation means; determination means for determining whether or not the selected one print mode for each page is identical to a set print mode; and changing means for changing the set print mode into the selected one print mode, based on the determination by the determination means when a print control command for each page is generated.

According to a second aspect of the present invention, the foregoing object has been achieved through provision of the print control apparatus (according to the first aspect) further comprising: first setting means for setting a layout print mode in which print pages are reduced in size to be arranged on one page; wherein when the layout print mode is set by the first setting means, the computation means computes and totals in units of physical pages including reduced pages, based on the transformation-time coefficient data acquired for the print pages by the acquisition means, the transformation periods for transforming the graphics commands for the application.

According to a third aspect of the present invention, the foregoing object has been achieved through provision of the print control apparatus (according to the first aspect) further comprising: second setting means for setting a two-sided-layout print mode in which print pages are reduced in size to be arranged on one page as the front or back surface of a recording medium; wherein when the two-sided-layout print mode is set by the second setting means, the computation means computes and totals in units of front-surface or back-surface pages, based on the transformation-time coefficient data acquired for each of the print pages by the acquisition means, the transformation periods for transforming the graphics commands for the application.

According to a fourth aspect of the present invention, the foregoing object has been achieved through provision of the print control apparatus (according to the first aspect) wherein different print modes include a vector graphics print mode and a raster graphics print mode.

According to a fifth aspect of the present invention, the foregoing object has been achieved through provision of a print control method for transforming, in accordance with different print modes, graphics commands from an application into print control commands to be analyzed by a printer before transferring the print control commands via a predetermined communication medium, the print control method comprising: an acquisition step for acquiring transformation-time coefficient data for the print modes; a computation step for computing in units of pages, based on the transformation-time coefficient data acquired in the acquisition step, transformation periods for transforming the graphics commands from the application; a selecting step for selecting one print mode for each page which has the least transformation period by comparing the transformation periods for the print modes computed in the computation step; a determination step for determining whether or not the selected one print mode for each page is identical to a set print mode; and a changing step for changing the selected set print mode into the one print mode, based on the determination by the determination step when a print control command for each page is generated.

According to a sixth aspect of the present invention, the foregoing object has been achieved through provision of a print control method for transforming, in accordance with different print modes graphics commands from an application into print control commands to be analyzed by a printer before transferring the print control commands via a predetermined communication medium, the print control method comprising: an acquisition step for acquiring transformation-time coefficient data for each print mode; a first determination step for determining whether or not a layout print mode in which print pages are reduced in size to be arranged in one page is set; a computation step for computing and totaling in units of physical pages including reduced pages, based on each transformation-time coefficient data acquired in the acquisition step, transformation periods for transforming the graphics commands when the first determination step has determined that the layout print mode is set; a selecting step for selecting one print mode for each page which has the least transformation period by comparing the transformation periods for the print modes computed in the computation step; a second determination step for determining whether or not the print mode for each page selected in the selecting step is identical to a set print mode; and a changing step for changing the set print mode into the one print mode selected in the selecting step, based on the determination by the second determination step when a print control command for each print mode is generated.

According to a seventh aspect of the present invention, the foregoing object has been achieved through provision of a print control method for transforming, in accordance with different print modes, graphics commands from an application into print control commands to be analyzed by a printer before transferring the print control commands via a predetermined communication medium, the print control method comprising: an acquisition step for acquiring transformation-time coefficient data for each print mode; a first determination step for determining whether or not a two-sided-layout print mode in which print pages are reduced in size to be arranged in one page as the front surface or back surface of a recording medium is set; a computation step for computing and totaling in units of front-surface or back-surface pages, based on the transformation-time coefficient data acquired for each print page in the acquisition step, transformation periods for transforming the graphics commands for the application when the first determination step has determined that the two-sided-layout print mode is set; a selecting step for selecting one print mode for each page which has the least transformation period by comparing the transformation periods for the print modes computed in the computation step; a determination step for determining whether or not the print mode for each page selected in the selecting step is identical to a set print mode; and a changing step for changing the set print mode into the one print mode selected in the selecting step, based on the determination by the determination step when a print control command for each page is generated.

According to an eighth aspect of the present invention, the foregoing object has been achieved through provision of a storage medium containing machine-readable programs for controlling a data processing apparatus in which graphics commands from an application are transformed in accordance with different print modes into print control commands to be analyzed by a printer, and the print control commands are transferred via a predetermined communication medium, the programs each causing the data processing apparatus to perform the following steps comprising: an acquisition step for acquiring transformation-time coefficient data for each print mode; a computation step for computing in units of pages, based on the transformation-time coefficient data acquired in the acquisition step, transformation periods for transforming the graphics commands from the application; a selecting step for selecting one print mode for each page which has the least transformation period by comparing the transformation periods for the print modes computed in the computation step; a determination step for determining whether or not the selected one print mode for each page is identical to a set print mode; and a changing step for changing the set print mode into the selected one print mode step, based on the determination by the determination step when a print control command for each page is generated.

According to a ninth aspect of the present invention, the foregoing object has been achieved through provision of a storage medium containing machine-readable programs for controlling a data processing apparatus in which graphics commands from an application are transformed in accordance with different print modes into print control commands to be analyzed by a printer, and the print control commands are transferred via a predetermined communication medium, the programs causing the data processing apparatus to perform the following steps: an acquisition step for acquiring transformation-time coefficient data for each print mode; a first determination step for determining whether or not a layout print mode in which print pages are reduced in size to be arranged in one page is set; a computation step for computing and totaling in units of physical pages including reduced pages, based on each transformation-time coefficient data acquired in the acquisition step, transformation periods for transforming the graphics commands when the first determination step has determined that the layout print mode is set; a selecting step for selecting one print mode for each page which has the least transformation period by comparing the transformation periods for the print modes computed in the computation step; a second determination step for determining whether or not the print mode for each page selected in the selecting step is identical to a set print mode; and a changing step for changing the set print mode into the one print mode selected in the selecting step, based on the determination by the second determination step when a print control command for each print mode is generated.

According to a tenth aspect of the present invention, the foregoing object has been achieved through provision of a storage medium containing machine-readable programs for controlling a data processing apparatus in which graphics commands from an application are transformed in accordance with different print modes into print control commands to be analyzed by a printer, and the print control commands are transferred via a predetermined communication medium, the programs causing the data processing apparatus to perform the following steps: an acquisition step for acquiring transformation-time coefficient data for each print mode; a first determination step for determining whether or not a two-sided-layout print mode in which print pages are reduced in size to be arranged in one page as the front surface or back surface of a recording medium is set; a computation step for computing and totaling in units of front-surface or back-surface pages, based on the transformation-time coefficient data acquired for each print page in the acquisition step, transformation periods for transforming the graphics commands for the application when the first determination step has determined that the two-sided-layout print mode is set; a selecting step for selecting one print mode for each page which has the least transformation period by comparing the transformation periods for the print modes computed in the computation step; a determination step for determining whether or not the print mode for each page selected in the selecting step is identical to a set print mode; and a changing step for changing the set print mode into the one print mode selected in the selecting step, based on the determination by the determination step when a print control command for each page is generated.

BRIEF DESCRIPTION OF THE DRAWINGS

FIGS. 7A and 7B are examples of data acquired from the printer driver 203 by the dispatcher 301 shown in FIG. 3.

FIG. 9 is a chart illustrating methods for computing processing time values for print modes in a print control apparatus according to the present invention.

FIG. 13 is a memory map of a storage medium for storing various data processing programs capable of being read by a print system to which a print control apparatus according to the present invention can be applied.

DESCRIPTION OF THE PREFERRED EMBODIMENTS

First Embodiment

One preferred embodiment of the present invention will be described below with the attached drawings.

Figure 1:
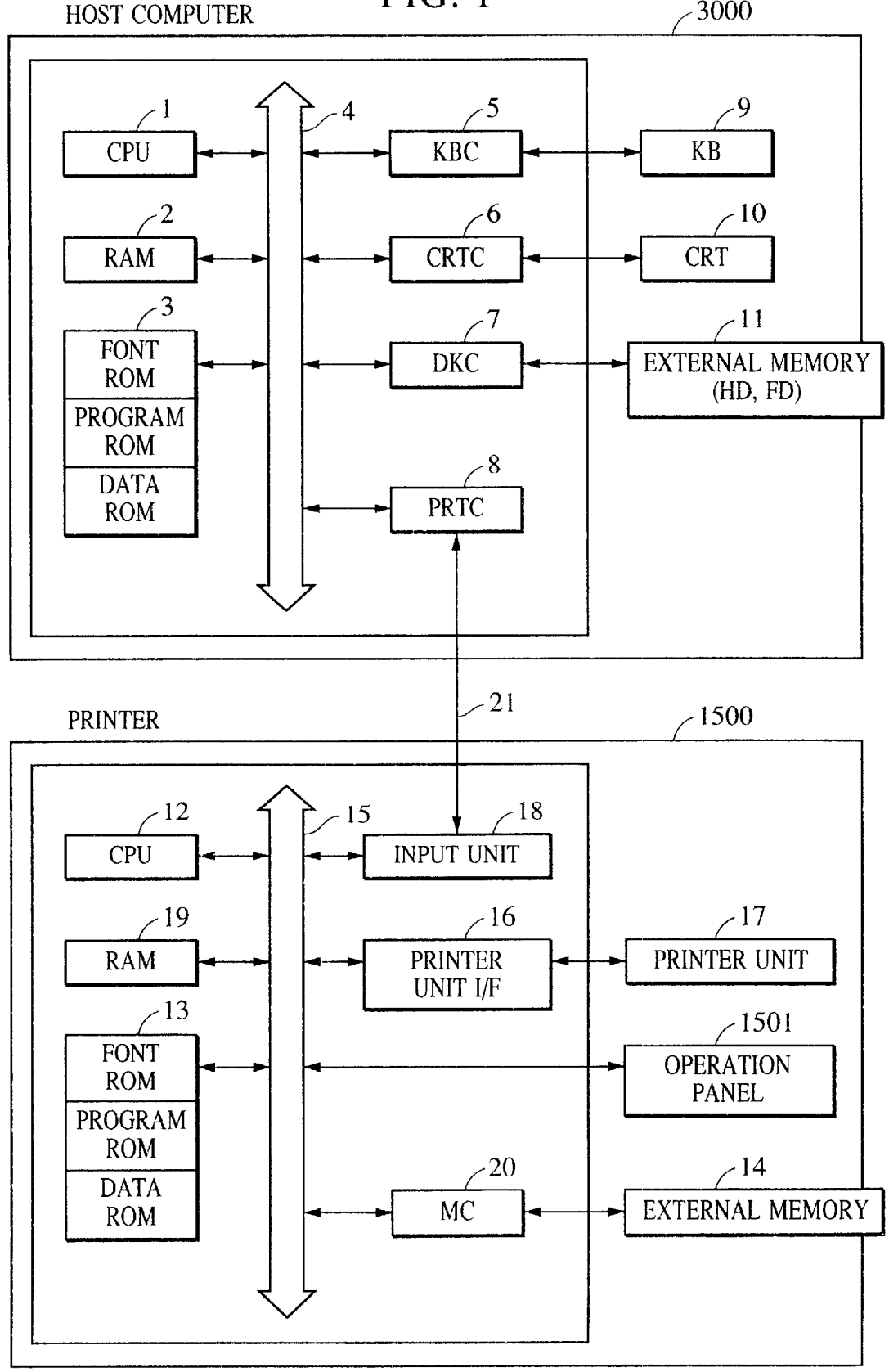
FIG. 1 is a block diagram illustrating a printer control system to which a print control apparatus according to a first embodiment of the present invention can be applied.

FIG. 1 shows a block diagram of a printer control system to which a printer control apparatus according to a first embodiment of the present invention is applied. The present invention can be applied to a single unit, a system composed of a plurality of units, and systems connected for processing via a network such as a local area network (LAN) or a wide area network (WAN).

A host computer 3000 includes a central processing unit (CPU) 1 that executes based on a document processing program or the like, stored in a program read-only memory (program ROM) 3 or an external memory 11, the processing of a document composed of figures, images, characters, tables (including spreadsheets), etc. The CPU 1 performs total control of devices connected to a system bus 4.

An operating system (OS) as a control Program for the CPU 1 is stored in the program ROM of the ROM 3 or the external memory 11. Font data used for the document processing are stored in the Font ROM of the ROM 3 or the external memory 11. Various data used for the document processing are stored in the Data ROM of the ROM 3 or the external memory 11. A random access memory (RAM) 2 functions as a main memory and a work memory for the CPU 1. A keyboard controller (hereinafter referred to as a "KBC") 5 controls key inputs from a keyboard (KB) 9 and a pointing device (not shown).

A cathode ray tube controller (hereinafter referred to as a "CRTC") 6 controls displaying by a CRT display (hereinafter referred to as a "CRT") 10. A disk controller (hereinafter referred to as a "DKC") 7 controls access to the external memory 11, for example, a hard disk (HD) or a floppy disk (FD) holding a boot program, various applications, font data, user files, editing files, a printer-control command generating program (hereinafter referred to as a "printer driver"), etc.

A printer controller (PRTC) 8 is connected to a printer 1500 via a predetermined bidirectional interface (hereinafter referred to as an "interface") 21, and executes communication control processing with the printer 1500. The CPU 1 executes rasterization of outline font to a display information RAM provided in, for example, the RAM 2, whereby enabling WYSIWYG on the CRT 10.

The CPU 1 opens various windows registered based on a command designated with a mouse cursor or the like (not shown) on the CRT 10, and executes various types of data processing. When a user executes printing, the user opens a window related to the print settings, and performs printer setting, and the setting of a printing method for the printer driver, including the selecting of a print mode.

In the printer 1500, a printer CPU (hereinafter referred to as a "CPU") 12 outputs based on a control program stored in the Program ROM of a ROM 13 or in an external memory 14 an image signal (output information) through a printer unit interface (printer unit I/F) 16 to a printer unit (printer engine) 17 connected to a system bus 15.

In the Program ROM of the ROM 13, programs including a control program for the CPU 12 are stored. In the Font ROM of the ROM 13, data including font data, used when the output information is generated, is stored. In the Data ROM of the ROM 13, information used by the host computer 3000 is stored in the case where the printer 1500 is not provided with the external memory 14 (e.g., a hard disk). The CPU 12 can perform communication processing with the host computer 3000 using an input unit 18. The CPU 12 can inform the host computer 3000 of internal information about the printer 1500.

A RAM 19 functions as a main memory, a work area, etc., for the CPU 12. The RAM 19 is designed to expand its storage capacity by using an optional RAM connected to an add-in port (not shown).

The RAM 19 is used as an output-information loading region, an environmental-data storing region, and a non-volatile RAM (NVRAM). Access to the external memory 14 is controlled by a memory controller (MC) 20. The external memory 14 is connected as an option to the printer 1500, and stores font data, emulation programs, form data, etc. An operation panel 1501 has switches and light-emitting-diode (LED) indicators (not shown) for operations.

The printer 1500 does not need to have only one external memory, but may have at least one external memory so that a plurality of external memories, such as a built-in font card, an optional-font card, and a memory card storing a program for interpreting a different-system printer control language, can be connected to the printer 1500. The printer 1500 may include an NVRAM (not shown) for storing printer-mode setting information from the operation panel 1501.

Figure 2:
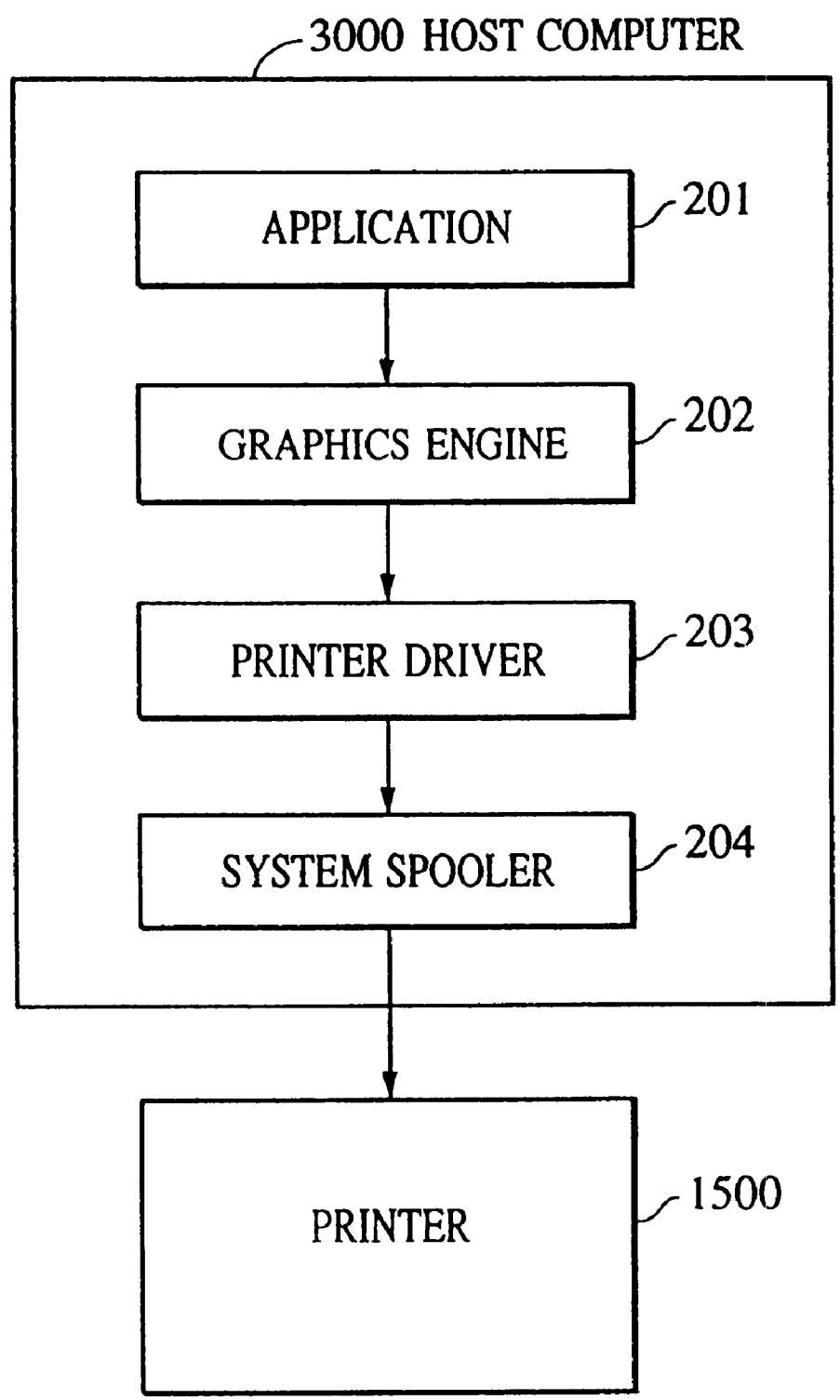
FIG. 2 is a block diagram illustrating the flow of print data in the printer control system shown in FIG. 1.
Figure 3:
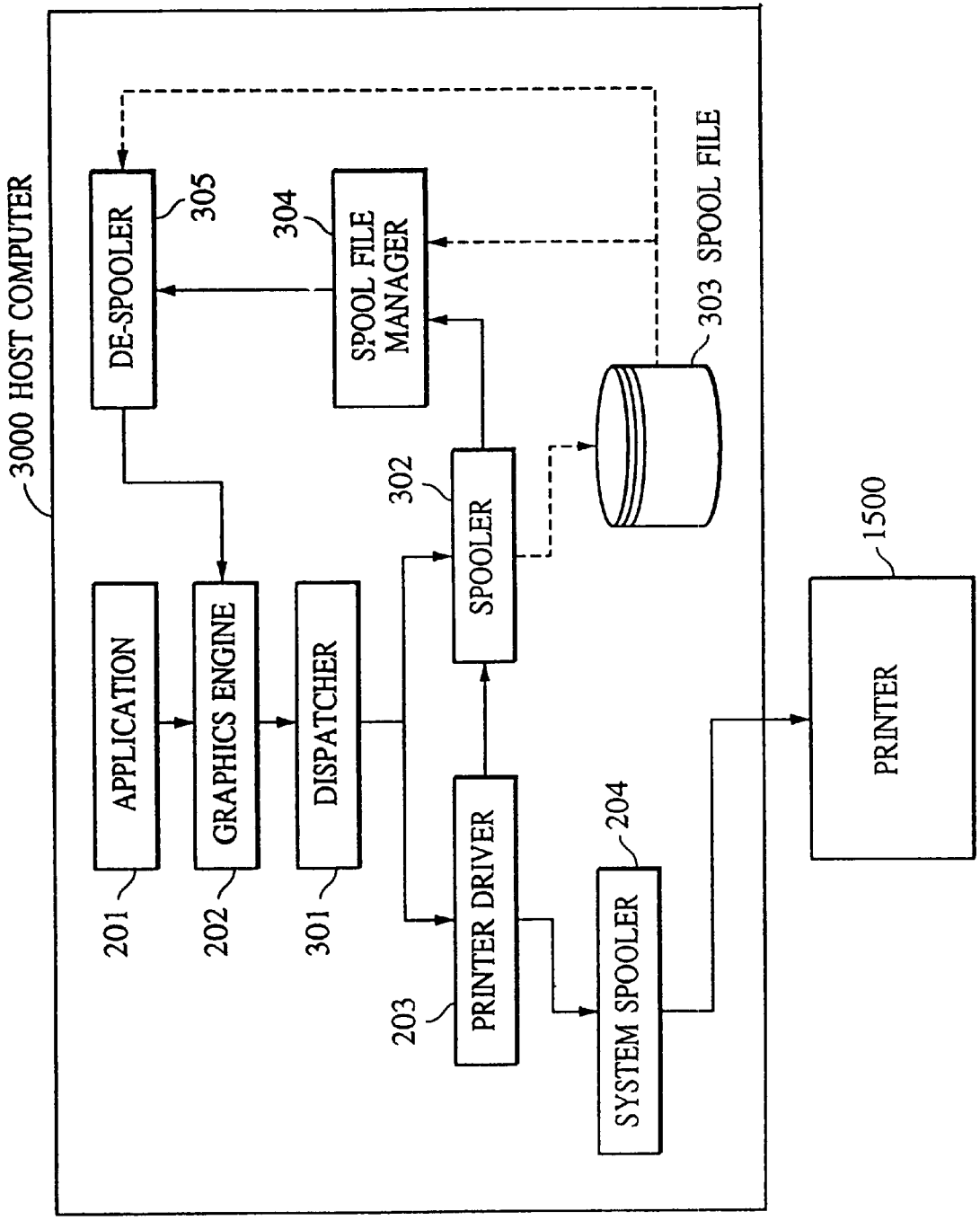
FIG. 3 is a block diagram illustrating the flow of print data in the printer control system shown in FIG. 1.

FIGS. 2 and 3 show block diagrams illustrating the flow of print data in the printer control system shown in FIG. 1, and correspond to a typical example of print processing in a host computer to which a printer is directly connected, or is connected by a network.

Referring to FIGS. 2 and 3, an application 201, a graphics engine 202, a printer driver 203, and a system spooler 204 exist as files stored in the external memory 11, and program modules. Each program module is loaded into the RAM 2 and executed by the OS or another program module using the loaded program module.

The application 201 and the printer driver 203 can additionally be stored to the external memory 11 for the host computer 3000 via the external memory 11, a compact disc read-only memory (CD-ROM) (not shown), or a network (not shown). The application 201 stored in the external memory 11 is loaded into the RAM 2 and executed. When the application 201 instructs the printer 1500 to perform printing, the graphics engine 202 loaded into the RAM 2 for execution is used to perform outputting (rendering).

The graphics engine 202 loads the printer driver 203 (prepared for each printer) from the external memory 11 into the RAM 2, and uses the printer driver 203 to transform the output of the application 201 into a control command for the printer 1500. The transformed printer control command is output to the printer 1500 by using the system spooler 204 loaded into the RAM 2 by the OS via the I/F 21. (see FIG. 1).

The first embodiment uses as a premise the printing system consisting of the printer 1500 and the host computer 3000 shown in FIG. 2, and further uses as a premise the printer control system shown in FIG. 3 in which print data from the application 201 is spooled when being in intermediate code data condition.

In particular, the printer control system shown in FIG. 3 is an expansion of the printer control system shown in FIG. 2, and has a structure in which when a print command is transmitted from the graphics engine 202 to the printer driver 203, a spool file 303, composed of intermediate code data, is once generated.

In the printer control system shown in FIG. 2, the application 201 is free from printing when the printer driver 203 has transformed all print commands from the graphics engine 202 into printer control commands. Conversely, in the printer control system shown in FIG. 3, the application 201 is free from printing when the spooler 302 transformed all print commands into intermediate code data and has output them to the spool file 303. Normally, the latter needs a shorter time.

In addition, the printer control system shown in FIG. 3 can process contents of the spool file 303, whereby functions not included in the application 201, such as enlargement or reduction of print data from the application 201, and the printing of one page having reduced pages, are realized.

For these purposes, the printer control system shown in FIG. 2 has been expanded to provide the printer control system shown in FIG. 3 in which the intermediate code data is spooled. For processing the print data, by performing setting from a window provided by the printer driver 203, the printer driver 203 stores the setting conditions in the RAM 2 or the external memory 11.

The structure of the printer control system shown in FIG. 3 will be described below.

In this printer control system, a dispatcher 301 receives a print command from the graphics engine 202. In the case where the received print command is a print command issued from the application 201 to the graphics engine 202, the dispatcher 301 loads the spooler stored in the external memory 11 into the RAM 2, and transmits the print command not to the printer driver 203, but rather to the spooler 302. The spooler 302 transforms the received print command into intermediate code data, and outputs it to the spool file 303.

The spooler 302 acquires from the printer driver 203 processing-setting information about the print data set for the printer driver 203, and stores it in the spool file 303.

Although the spool file 303 is generated as a file in the external memory 11, it can be generated in the RAM 2. The spooler 302 also loads a spool file manager 304 stored in the external memory 11 into the RAM 2, and informs the spool file manager 304 of the generation condition of the spool file 303.

Subsequently, when the spool file manager 304 determines in accordance with the contents of the print-data-related processing-setting information stored in the spool file 303 that the graphics engine 202 is used again to perform printing, it loads a de-spooler 305 stored in the external memory 11 into the RAM 2, and instructs the de-spool 305 to perform print processing for the intermediate code data described in the spool file 303.

The de-spooler 305 processes in accordance with the contents of the processing-setting information included in the spool file 303 the intermediate code data included in the spool file 303, and outputs it via the graphics engine 202.

In the case where the print command received by the dispatcher 301 from the graphics engine 202 is a print command issued from the de-spooler 305 to the graphics engine 202, the dispatcher 301 switches the processing not the spooler 302, but rather to the printer driver 203. The printer driver 203 generates and outputs a printer control command to the printer 1500 via the system spooler 204.

The first embodiment shows printer's print modes where two printer-control-command generating techniques differ considerably, as described below.

It is in the printer driver 203 that the printer-control-command generating techniques are executed. In accordance with the contents of a printer control command generated by the printer driver 203, the print mode of the printer 1500, having received the printer control command, is determined.

The features of the first embodiment will be further described with reference to FIG. 3, etc.

The present invention provides a print control apparatus for transforming, in accordance with different print modes, rendering commands from an application into print control commands to be analyzed by the printer 1500 before transferring the print control commands via a predetermined communication medium, the print control apparatus comprising: an acquisition unit (e.g., the dispatcher 301) for acquiring transformation-time coefficient data for the print modes; a computation unit (e.g., the spooler 302) for computing in units of pages, based on the transformation-time coefficient data acquired by the acquisition unit, transformation periods for transforming the rendering commands from the application; a selecting unit (e.g., the spooler 302) for selecting one print mode for each page which has the least transformation period by comparing the transformation periods for the print modes computed by the computation unit; a determination unit (e.g., the de-spooler 305) for determining whether or not the one print mode for each page selected by the selecting unit is identical to a set print mode; and a changing unit (e.g., the de-spooler 305) for changing the set print mode into the one print mode selected by the selecting unit, based on the determination by the determination unit when a print control command for each page is generated. Accordingly, the optimal print mode for each page, which has a minimum print processing time, can automatically be set in predetermined units (of pages or jobs) regardless of the print mode set by a user, which can significantly increase printing throughput.

Initially, the two printer-control-command generating techniques will be described below with reference to flowcharts. The processes shown in the flowcharts can be executed by the standard printer control system in the host computer 3000 shown in FIG. 2, and the printer control system shown in FIG. 3 obtained by expanding the printer control system shown in FIG. 2.

Figure 4:
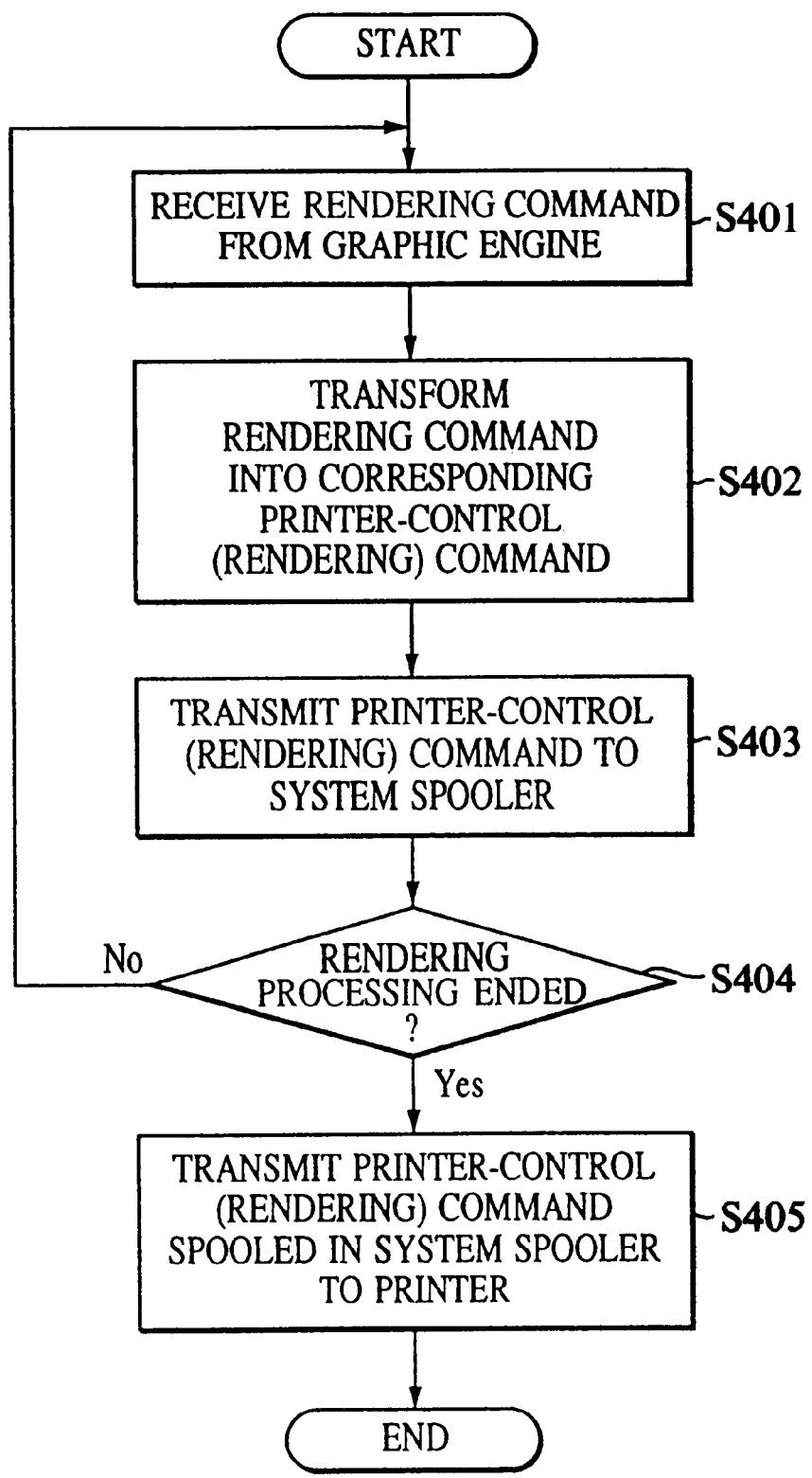
FIG. 4 is a flowchart showing a process for first data processing in a print control apparatus according to the present invention.
Figure 5:
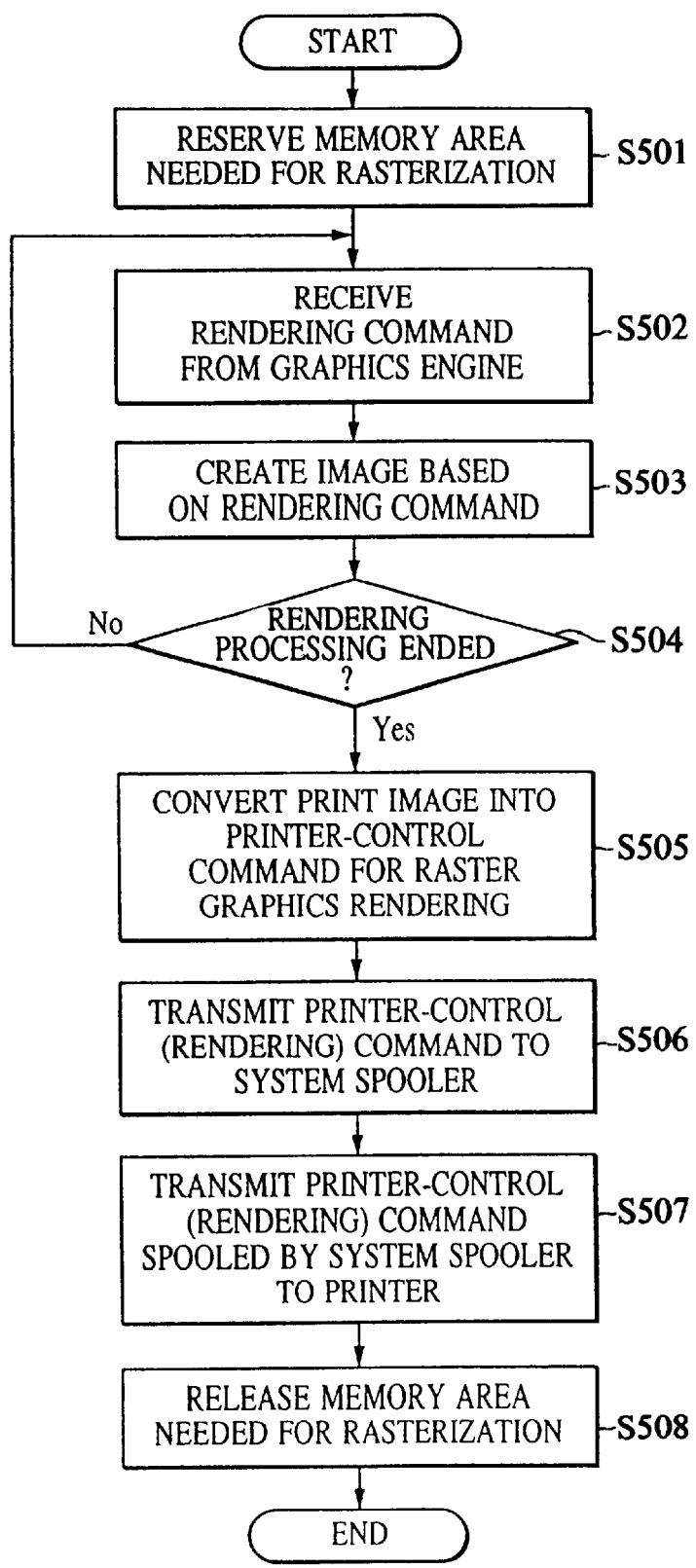
FIG. 5 is a flowchart showing a process for second data processing in a print control apparatus according to the present invention.

Specifically, in the host computer 3000, under the control of the OS, when print processing is started by the application 201 that is loaded into the RAM 2 and activated by an instruction from the user, the printer-control-command generating program shown in FIG. 4 or 5 is executed by the printer driver 203 loaded into the RAM 2.

FIG. 4 is a flowchart showing an example of a first data processing process in the printer control apparatus according to the present invention. The steps of the process are denoted by reference numerals S401 to S405.

The printer driver 203 receives a rendering command from the application 201 via the graphics engine 202 S401. The printer driver 203 transforms the rendering command (e.g., line rendering) into a corresponding printer-control (rendering) command data S402. The printer-control (rendering) command data is spooled to the RAM 2 or the external memory 11 by the system spooler 204 S403.

The process determines whether rendering processing by the application 201 and the graphics engine 203 has ended S404. If the rendering processing has not ended, the process returns to step S401, in which the same processing is repeatedly performed.

If the process has determined in step S404 that the rendering processing ended, the printer-control command data spooled by the system spooler 204 is transmitted to the printer 1500 S405 before the process ends.

This printer-control-command generating technique (hereinafter referred to as the "vector-graphics print mode") that is executed by the printer driver 203 is characterized in that a program loaded from the Program ROM of the ROM 13 into the RAM 19 in the printer 1500 performs print image generation (rasterization) because a printer-control (rendering) command for geometric expression corresponding to vector-graphics (e.g., line), etc., is transmitted to the printer 1500. In rasterization, a time needed for print processing in the printer 1500 is determined by the types and number of objects to be processed in the printer 1500.

Next, the printer-control-command generating technique (hereinafter referred to as the "raster-graphics print mode") shown in FIG. 5 will be described below.

FIG. 5 is a flowchart showing an example of a second data processing process in the printer control apparatus according to the present invention. The steps of the process are denoted by reference numerals S501 to S508.

The printer driver 203 reserves in the RAM 2 a memory area (hereinafter referred to as a "band memory") for storing a print image whose rasterization is performed by The printer driver 203 in the host computer 3000 S501. It receives a rendering command from the application 201 via the graphics engine 202 S502.

The rasterization of the received rendering command (e.g., line rendering, etc.) to a print image is quickly performed by the printer driver 203 S503. The print image is stored in the band memory. The process determines whether rendering processing by the application 201 and the graphics engine 202 has ended S504. If the rendering processing has not ended, the process returns to step S501, in which the same processing is repeatedly performed.

If the process has determined that the rendering processing ended, the print image stored in the band memory is fine divided if necessary, and is transformed into a plurality of printer-control (rendering) commands corresponding to bitmap data renderings S505. The printer-control (rendering) commands are output to the system spooler 204 S506.

The system spooler 204 transmits the printer-control command to the printer 1500 S507. The printer driver 203 frees band memory S508 before the process ends.

The raster-graphics print mode executed by the printer driver 203 is characterized in that mainly printer-control (rendering) commands corresponding to a bitmap image are transmitted to the printer 1500 because the rasterization of a rendering command (e.g., line rendering) is performed by the printer driver 203 activated when loaded into the RAM 2 in the host computer 3000. In the raster-graphics print mode, a time needed for print processing by the printer 1500 varies with the contents of the bitmap image data received by the printer 1500, and is determined by an image data size, namely, the size of paper.

Figure 6:
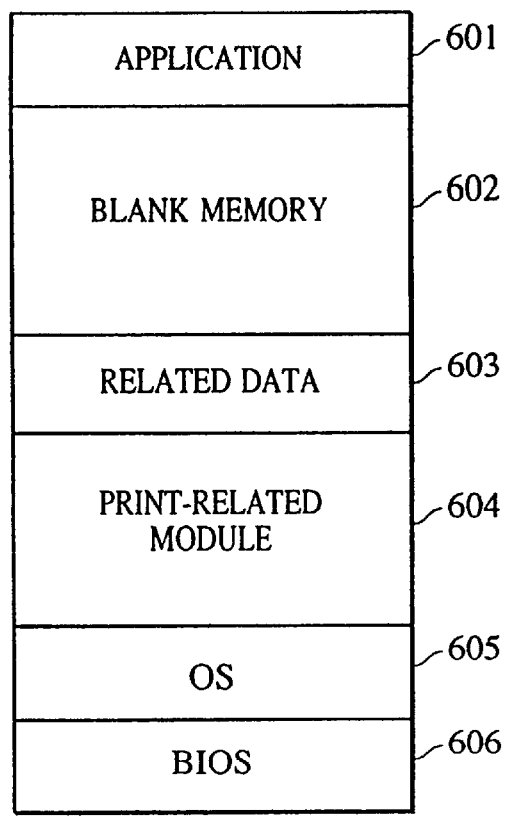
FIG. 6 is an example of the memory map of a RAM in the host computer shown in FIG. 1.

FIG. 6 shows an example of the memory map of the RAM 2 in the host computer 3000 shown in FIG. 1. The memory map shows the condition of the RAM 2 in which an application 601 including a print-related module 604 that includes the printing-mode control program according to the first embodiment, related data 603, an OS 605, and a basic input/output system (BIOS) 606 are loaded and executable. The RAM 2 uses a blank memory 602.

The print control system to which the present invention can be applied has been described. A specific data processing process according to the present invention that can be practiced in the above-described print control system will be described below.

FIGS. 7A and 7B show examples of data acquired from the printer driver 203 by the dispatcher 301 as shown in FIG. 3.

FIG. 7A corresponds to processing-time coefficient data based on each print mode. FIG. 7B shows the data formats of two print modes, the vector graphics print mode and the raster graphics print mode.

Figure 8:
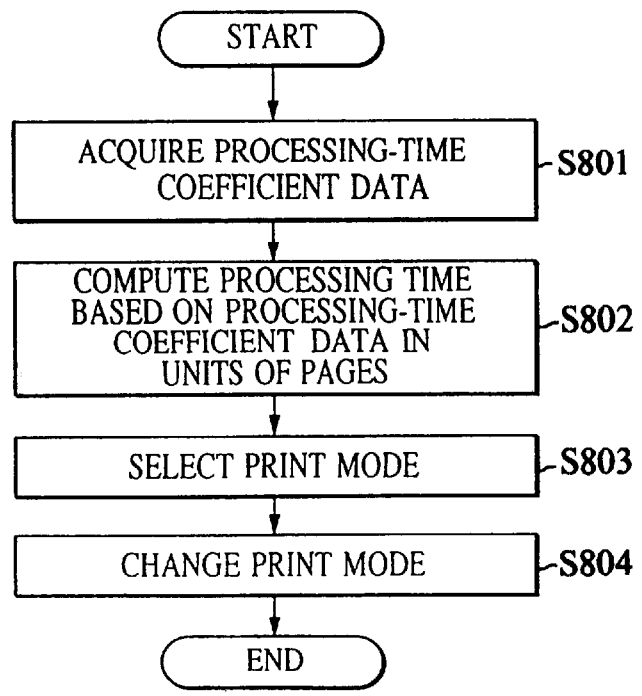
FIG. 8 is a flowchart showing a process for third data processing in a print control apparatus according to the present invention.

FIG. 8 is a flowchart showing an example of a third data processing process employed in the print control apparatus according to the present invention, which corresponds to the print-mode automatic control process. The steps of the process are denoted by reference numerals S801 to S804. The third data processing process is executed by the dispatcher 301, the spooler 302, the spool file manager 304, and the de-spooler 305 shown in FIG. 3.

The dispatcher 301 acquires processing-time coefficient data from the printer driver 203 S801. Data to be acquired is as shown in FIG. 7A. When a print mode in which the types and number of objects influence a print processing time as in the vector graphics print mode is used, processing-time coefficient data corresponding to the objects are acquired.

Each processing-time coefficient data is an absolute or relative value of a time for processing each object by the printer 1500 in the vector graphics print mode. In addition, in the case where commands are transmitted to the printer 1500, not in units of objects, but rather the bitmap image of each page image as described in the above-described raster graphics print mode, a processing-time coefficient corresponding to each paper size is acquired. An example of the details is shown in FIG. 7B.

The first embodiment shows only a case where the vector graphics print mode or the raster graphics print mode is automatically selected as one of the plurality of print modes functioning in the printer 1500. However, by acquiring all processing-time coefficient data for the print modes that are automatically selected, the present invention can be practiced for an arbitrary print mode.

The processing-time coefficient data to be acquired is acquired by a printer driver provided for each printer such as a printer connected to a host computer. In the printer driver, the features of the corresponding printer expressed in processing-time coefficient data are stored beforehand. In the case where the features cannot be expressed in fixed values due to effects of a printer's memory size, etc., necessary information is obtained via the I/F 21 with the printer 1500, or a user I/F such as a window provided by the printer driver 203, whereby processing-time coefficient data in accordance with each condition can be provided.

Next, a processing time in units of pages for each print mode as shown in FIG. 9 is computed based on the acquired processing-time coefficient data S802.

FIG. 9 illustrates a method for computing a processing time for each print mode in the print control apparatus according to the present invention.

A processing time for each print mode is a total of processing time coefficients included in one page. Thus, for example, in the case of the vector graphics print mode, the processing time is obtained by totaling the products (processing-time coefficient for each object x the number of objects) for all the objects.

This processing can be executed such that, in the spooler 302, when each object included in a print command from the graphics engine 202 is spooled, the products are added up for each page. However, it can be executed by also using a method in which, after the spool file 303 for one page is generated, totaling is performed for each object included in the intermediate code data of each page included in the spool file 303.

Conversely, in the case of the raster graphics print mode, a processing time coefficient corresponding to the size of a page to be processed is used as a processing time for the page. By using the above-described methods, processing time, for the print modes that can be switched by the printer 1500, is computed.

Next, based on the computed result obtained in step S802, a print mode in which the least processing time in units of pages or jobs is obtained is selected S803.

The computed result is a value that directly or indirectly represents a printing time needed by the printer 1500 for printing the page to be printed in one print mode to be selected. In the vector graphics print mode, by adding up processing time coefficients for each object while performing spooling by the spooler 302, the mode selecting can be executed by the spooler 302 when the generating of spool data for each page ends.

The mode selection can also be executed such that the spool file manager 304 or the de-spooler 305 refers to the spool file 303. In general, the former method has a higher processing efficiency.

In the case where the two modes, namely, the vector graphics print mode and the raster graphics print mode are used as selectable print modes, processing time values in both print modes are compared, and either print mode having the smaller value is selected as a print mode to be used for the page.

In the case where the printer 1500 has a plurality of selectable print modes, processing time values for each page in all the print modes are compared, and a print mode having the least processing time is selected, whereby the present invention can be applied.

When the print mode of the printer driver 203 differs from the print mode selected in step S803 shown in FIG. 8, the de-spooler 305 changes the print mode of the printer driver 203 into the print mode selected in step S803 shown in FIG. 8 S804, and prints the contents of the spool file 303 via the graphics engine 202.

This print mode changing is performed by setting the print mode for each page selected in step S803 shown in FIG. 8. For print mode changing, in addition to a method in which a user directly sets a print mode using a user I/F such as a window, a method in which a user sets a print mode using an ordinary application may be used.

For example, under the control of a general OS, the user can set print conditions such as a paper size and a paper direction from an application. Concerning print mode setting, there may an OS in which print conditions cannot be set. However, in OSs such as "Windows 95™" and "Windows NT™", printer condition setting is managed by a data structure in which an application or printer drivers can refer to the setting. Accordingly, the data structure normally includes the setting of print conditions.

Under-the control of the general OS, the internal data of the data structure can be changed through an application, etc., and a print mode can be changed through an application. In the first embodiment, the de-spooler 305 changes the printer-setting data structure of the printer driver 203, whereby performing print mode control.

"Windows 95" and "Windows NT" are mentioned as examples of OSs in which a print mode can be changed. However, the present invention may be applied to any OSs in which print mode settings can be changed.

As described in the first embodiment, in a print-mode automatic control method according to the present invention, the features of printer's processing time are expressed in processing-time coefficients, and the obtained data are supplied to a print system in which a printer driver for each printer generates intermediate code data, whereby from among a plurality of printer's print modes, a print mode adapted for the contents of a print job is selected and provided.

This makes it possible to avoid a problem of a decrease in printing efficiency generated when a print mode, selected by a user, is not adapted for the contents of actual printing, which can increase printing throughput.

In a print-mode automatic control method according to the present invention, a printer driver 203 provided for each printer supplies printer characteristics and processing-time coefficients in accordance with a specific condition, whereby print mode selecting in which printer characteristics are taken into consideration can automatically be performed.

The present invention can also be applied to the case where the above-described functions in the first embodiment are provided by programs installed from the exterior, or by loading information including programs from a storage medium for a host computer such as a floppy disc, or external storage media via a local area network, personal computer communications, and a network, into a system including an output unit and the host computer.

The features of the first embodiment will be described to FIG. 8, etc.

The present invention provides a print control method for transforming, in accordance with different print modes, rendering commands from an application into print control commands to be analyzed by a printer before transferring the print control commands via a predetermined communication medium, and a storage medium containing machine-readable programs for controlling a data processing apparatus in which rendering commands from an application are transformed in accordance with different print modes into print control commands to be analyzed by a printer, and the print control commands are transferred via a predetermined communication medium, wherein the print control method and each program comprise: an acquisition step (step S801 shown in FIG. 8) for acquiring transformation-time coefficient data for the print modes; a computation step (step S802 shown in FIG. 8) for computing in units of pages, based on the transformation-time coefficient data acquired in the acquisition step, transformation periods for transforming the rendering commands from the application; a selecting step (step S803 shown in FIG. 8) for selecting one print mode for each page which has the least transformation period by comparing the transformation periods for the print modes computed in the computation step; a determination step (step S804 shown in FIG. 8) for determining whether or not the one print mode for each page selected in the selecting step is identical to a set print mode; and a changing step (step S804 shown in FIG. 8) for changing the set print mode into the one print mode selected in the selecting step, based on the determination by the determination step when a print control command for each page is generated. Accordingly, the optimal print mode for each page, which has a minimum print processing time, can automatically be set in predetermined units (of pages or jobs) regardless of the print mode set by a user, which can significantly increase printing throughput.

Second Embodiment

According to a second embodiment of the present invention, in the case where the printer driver 203 operating when being loaded into the RAM 2 in the host computer 3000, and the printer 1500 have a function (N-page printing) of reducing a plurality of print pages (logical pages) and arranging them in one page (physical page), it is possible that, by using a means for finding a print mode adapted for the print processing described in the first embodiment, and a means for generating based on the print mode found by the finding means, from an intermediate code, print data to be transmitted, are used, with the number of the logical pages taken into consideration.

The second embodiment will be described below with reference to FIG. 3, etc.

A print control apparatus having the above-described structure includes a first setting unit (the printer driver 203) that sets a layout print mode in which a plurality of print pages are reduced in size to be arranged in one page. When the layout print mode is set, the spooler 302 computes and adds up in units of pages, based on transformation-time coefficient data acquired for each print page by the acquisition means, a rendering-command transformation time from the application. Therefore, a print mode having the least print processing time can automatically be selected in predetermined units (units of pages or jobs), regardless of the user-selected print mode, even when the layout print mode is set, whereby printing throughput can significantly be increased.

In the case where the printer's print mode can be switched in the same page, the print mode selecting for each page in the first embodiment can be performed for each logical page. A process executed in the case where the print mode cannot be switched in the same page is described below.

Figure 10:
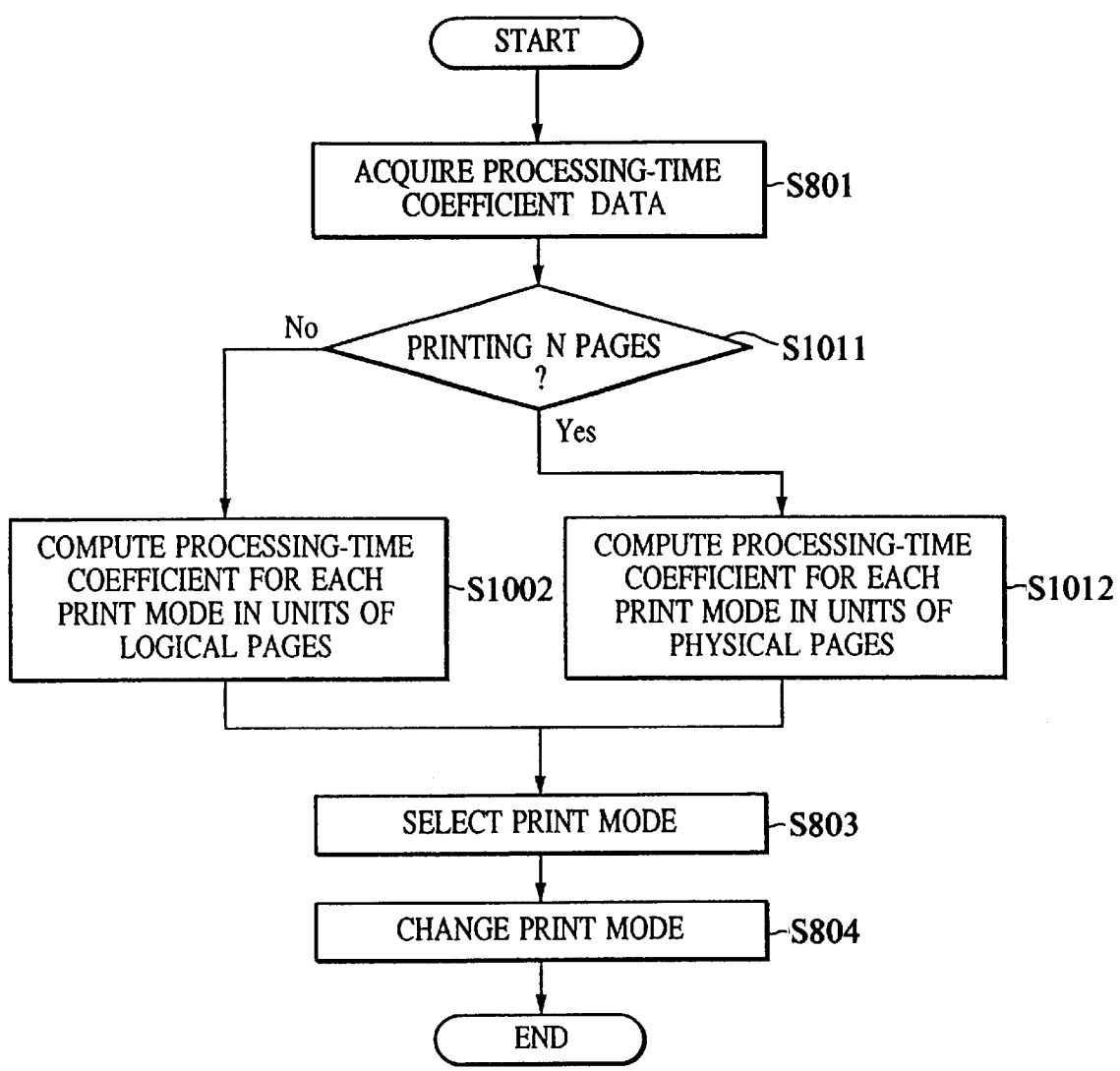
FIG. 10 is a flowchart showing a process for data processing in a print control apparatus according to a second embodiment of the present invention.

FIG. 10 is a flowchart showing an example of a process for data processing in the print control apparatus according to the second embodiment of the present invention. The steps of the process are denoted by reference numerals S1011 and S1012. Steps identical to those shown in FIG. 8 are denoted by identical reference numerals.

In step S801 shown in FIG. 10, processing-time coefficients for all print modes that can be selected by the printer 1500 are acquired, similarly to the first embodiment. In step S1011, the process determines whether the present print job is for printing N pages. The setting of the N-page printing can be acquired from the spooler 302 by the printer driver 203.

In the first embodiment, a processing-time coefficient for each print mode is computed in units of pages in step S802 shown in FIG. 8. In this case, as in step S1002 physical pages correspond to logical pages.

If, in step S1011 shown in FIG. 10, the process has determined that the N-page printing is set, physical pages do not correspond to logical pages. Thus, in step S1012, processing-time coefficients for each print mode are computed in units of physical pages.

In step S803 for print mode selecting, and step S804 for print mode changing, by performing processing similar to that in the first embodiment for not the logical pages but the physical pages, the present invention can be applied, even when the N-page printing is performed.

The N-page printing is realized by a method in which the printer 1500 reduces print data for N pages to be arranged in one page, and another method in which the de-spooler 305 arranges in one page, print data for N pages included in the spool file 303. Both methods can perform the same processing.

The features of the second embodiment will be described with reference to FIG. 10, etc.

The present invention provides a print control method for transforming, in accordance with different print modes, rendering commands from an application into print control commands to be analyzed by a printer before transferring the print control commands via a predetermined communication medium, and a storage medium containing machine-readable programs for controlling a data processing apparatus in which rendering commands from an application are transformed in accordance with different print modes into print control commands to be analyzed by a printer, and the print control commands are transferred via a predetermined communication medium, wherein the print control method and each program comprise: an acquisition step (step S801 shown in FIG. 10) for acquiring transformation-time coefficient data for each print mode; a first determination step (step S1011 shown in FIG. 10) for determining whether or not a layout print mode in which print pages are reduced in size to be arranged in one page is set; a computation step (step S1012 shown in FIG. 10) for computing and totaling in units of physical pages each including reduced pages, based on each transformation-time coefficient data acquired in the acquisition step, transformation periods for transforming the rendering commands when the first determination step has determined that the layout print mode is set; a selecting step (step S803 shown in FIG. 10) for selecting one print mode for each page which has the least transformation period by comparing the transformation periods for the print modes computed in the computation step; a second determination step (not shown)(step before step S804 shown in FIG. 10) for determining whether or not the print mode for each page selected in the selecting step is identical to a set print mode; and a changing step (step S804 shown in FIG. 10) for changing the set print mode into the one print mode selected in the selecting step, based on the determination by the second determination step when a print control command for each print mode is generated. Accordingly, the optimal print mode for each page, which has a minimum print processing time, can automatically be set in predetermined units (of pages or jobs) regardless of the print mode set by a user, which can significantly increase printing throughput.

Third Embodiment

A third embodiment of the present invention, in which the present invention is applied to processing for the case where printing using the two-sided print function of the printer 1500 is set when an operating application executes print processing under the control of the OS in the host computer 3000, will be described. In the case where the printer's print mode can be switched for the front or back surface of the same paper, the print mode selected for each page in the first embodiment is selected for the front or back surface, whereby the present invention can be practiced.

The features of the present invention will be described with reference with FIG. 3, etc.

A print control apparatus having the above-described structure includes a second setting unit (the printer driver 203) for setting a two-sided-layout print mode in which a plurality of print pages are reduced to be arranged in one page for printing on the front and back surfaces of a recording medium. When the two-sided-layout print mode is set, the spooler 302 computes and adds up in units of front or back surface pages, based on transformation-time coefficient data acquired for each page by the acquisition unit, rendering-command transformation time from the application. Thus, an optimal print mode having the least print processing time can automatically be set in predetermined units (units of pages or jobs), even when the two-sided-layout print mode is set, whereby printing throughput can significantly be increased.

A process performed in the case where print mode selecting cannot be performed for the front or back surface of the same paper will be described below.

Figure 11:
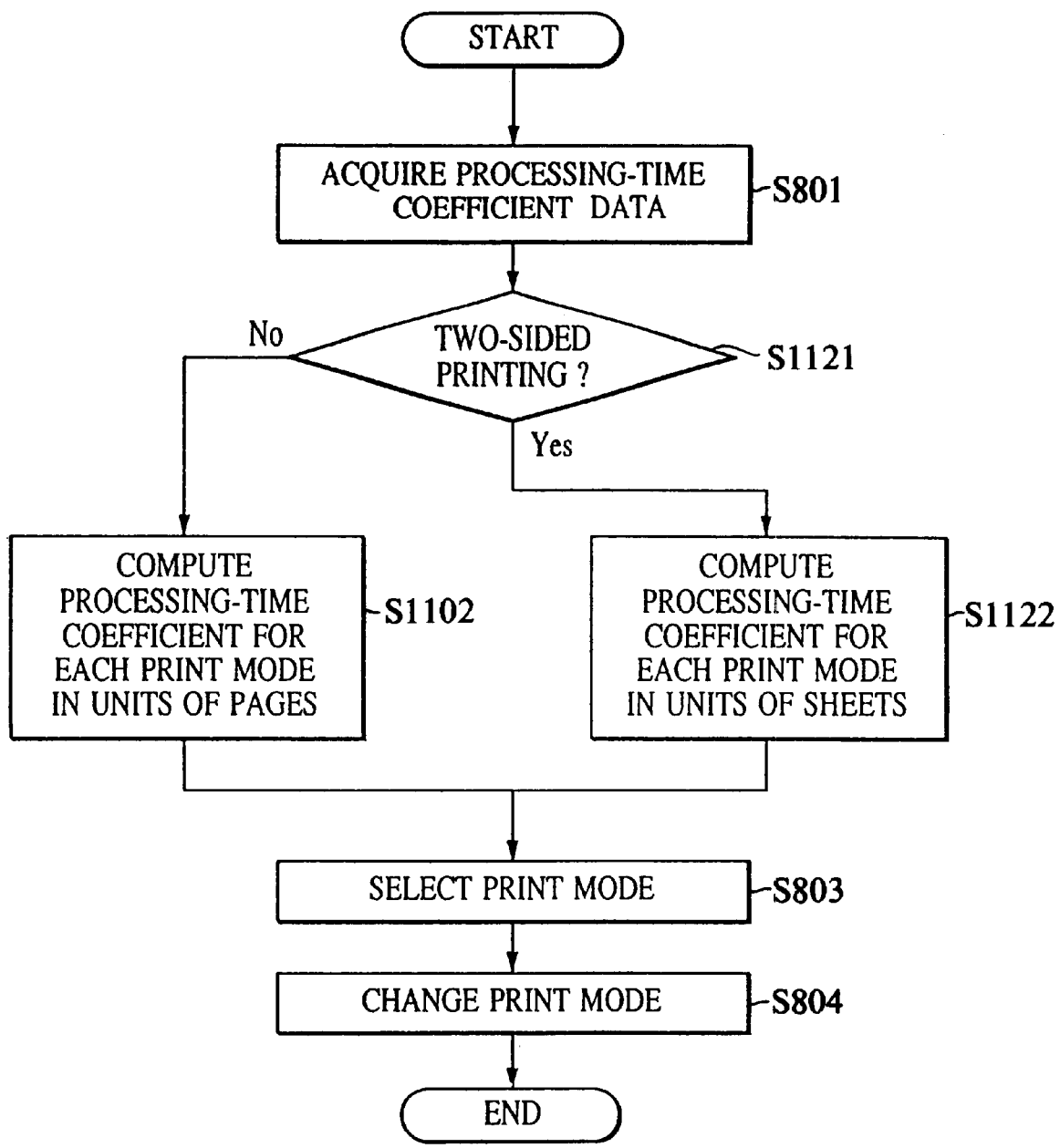
FIG. 11 is a flowchart showing a process for data processing in a print control apparatus according to a third embodiment of the present invention.

FIG. 11 is a flowchart showing an example of a process for data processing in the print control apparatus according to the third embodiment of the present invention. The steps of the process are denoted by reference numerals S1121 and S1122. Steps identical to those shown in FIG. 8 are denoted by identical reference numerals.

In step S801 shown in FIG. 11, processing-time coefficients for all print modes that can be selected by the printer 1500 are acquired, similarly to the first embodiment.

In step S1121, the process determines whether the present print job is for two-sided printing. The setting of the two-sided printing can be acquired from the spooler 302 by the printer driver 203. In the first embodiment, a processing-time coefficient for each print mode is computed in units of pages in step S802 shown in FIG. 8 as in step S1102 However, in step S1121, if the process has determined that the two-sided printing is set, a processing-time coefficient for each print mode is computed in units of sheets (units of front or back surfaces) in step S1122 because the front and back surfaces of the same page have the same print mode.

In step S803 for print mode selecting, and step S804 for print mode changing, by performing processing similar to that in the first embodiment, not for the page, but rather for the sheet, the present invention can be applied, even when two-sided printing is performed.

The features of the third embodiment will be described with reference to FIG. 11, etc.

The present invention provides a print control method for transforming, in accordance with different print modes, rendering commands from an application into print control commands to be analyzed by a printer before transferring the print control commands via a predetermined communication medium, and a storage medium containing machine-readable programs for controlling a data processing apparatus in which rendering commands from an application are transformed in accordance with different print modes into print control commands to be analyzed by a printer, and the print control commands are transferred via a predetermined communication medium, wherein the print control method and each program comprise: an acquisition step (step S801 shown in FIG. 11) for acquiring transformation-time coefficient data for each print mode; a first determination step (step S121 shown in FIG. 11) for determining whether or not a two-sided-layout print mode in which print pages are reduced in size to be arranged in one page as the front surface or back surface of a recording medium is set; a computation step (step S122 shown in FIG. 11) for computing and totaling in units of front-surface and back-surface pages, based on each transformation-time coefficient data acquired for each print page in the acquisition step, transformation periods for transforming the rendering commands for the application when the first determination step has determined that the two-sided-layout print mode is set; a selecting step (step S803 shown in FIG. 11) for selecting one print mode for each page which has the least transformation period by comparing the transformation periods for the print modes computed in the computation step; a determination step (not shown)(step before step S804 shown in FIG. 11) for determining whether or not the print mode for each page selected in the selecting step is identical to a set print mode; and a changing step (step S804 shown in FIG. 11) for changing the set print mode into the one print mode selected in the selecting step, based on the determination by the determination step when a print control command for each page is generated. Accordingly, even if the two-sided layout print mode is set, the optimal print mode for each page, which has a minimum print processing time, can automatically be set in predetermined units (of pages or jobs) regardless of the print mode set by a user, which can significantly increase printing throughput.

Fourth Embodiment

A fourth embodiment of the present invention will be described in which the present invention is applied to the (binding output) case where the same print mode is set for continuous or discontinuous logical pages processed by the host computer 3000.

Figure 12A:
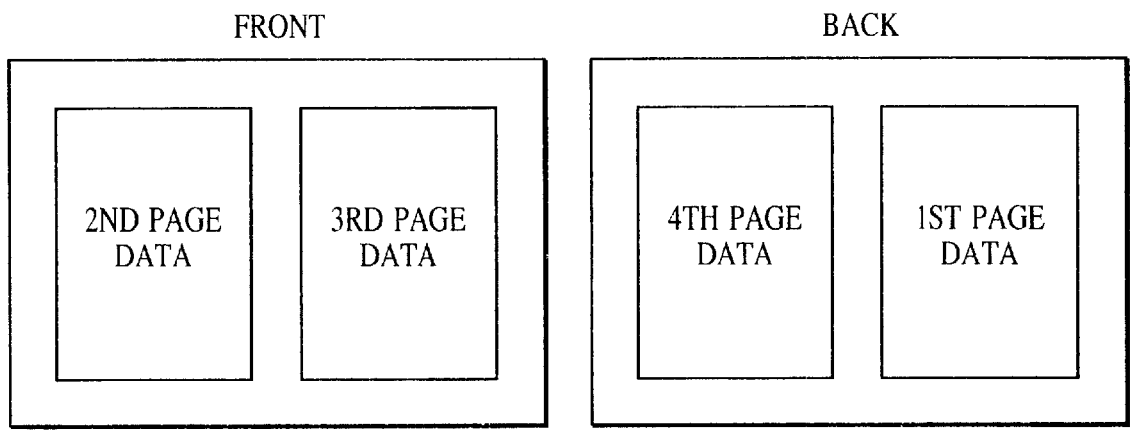
FIGS. 12A and 12B are schematic drawings showing print output forms by a print control apparatus according to a fourth embodiment of the present invention.
Figure 12B:
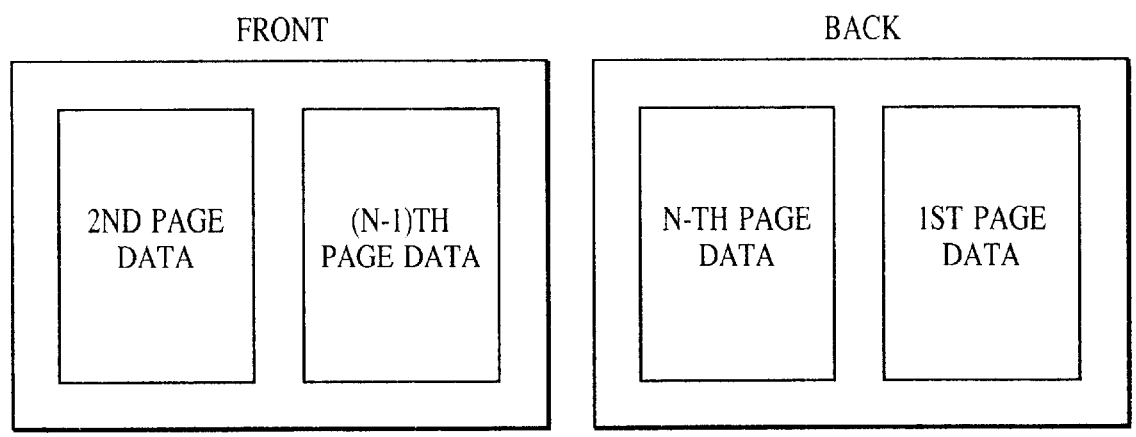

FIGS. 12A and 12B are schematic drawings showing print output forms used in the print control apparatus according to the fourth embodiment of the present invention. FIG. 12A corresponds to the case where four continuous pages are printed on one sheet of paper, and FIG. 12B corresponds to the binding printing case where a plurality of sheets of paper are folded in two so that a book format output is obtained.

In the binding output processing, a combination of the N-page printing function and the two-sided printing function can be used. However, in the case where continuous four pages are printed on a sheet of paper as shown in FIG. 12A, there may be a printer in which the first and fourth pages must have a type of print mode, and the second and three pages must have another type of print mode, and there may be a printer in which all pages must have the same print mode.

In the binding printing case where a plurality of sheets of paper are folded in two so that a book format output is obtained as shown in FIG. 12B, there is a method and function of printing in which the first and end pages are arranged in the same page, and a combination of logical pages to be printed in the same print mode can be changed depending on the number of total pages.

FIG. 12B shows pages (including the first page output) arranged on the front and back surfaces of one sheet of paper in the case where the number of total pages is N–3 to N (N is a multiple of 4).

To the original hardware specifications of a printer in which the above-described conditions are required, or the spool file's de-spool specifications, the present invention can be applied such that a time for processing all pages included in a logical page group, for which the same print mode should be selected, is computed for print modes, and a print mode having the least processing time is selected and used for all the pages included in the logical page group, whereby all the pages are printed in the optimal print mode.

In the fourth embodiment, an example of binding printing has been described. In addition, the fourth embodiment can be applied to the case where the same print mode needs to be selected for printing a plurality of continuous or discontinuous logical page groups.

Referring to the memory map shown in FIG. 13, the configuration of data processing programs capable of being read by a print system according to the present invention will be described below.

FIG. 13 illustrates the memory map of a storage medium in which various data processing programs capable of being read by the print system to which the present invention can be applied.

Also, information (not shown) for managing the programs stored in the storage medium, such as version information and program creators, are stored, and information (not shown) dependent on an OS, etc., of a program reader, such as icons indicating programs, may be stored.

In addition, data dependent on the programs are managed by directory information stored in the storage medium. Programs for installing the programs in a computer, programs for decompressing a compressed program to be installed, etc., may be stored.

The functions shown in FIGS. 4, 5, 8, 10, and 11, may be performed by the host computer 3000 using programs installed from the exterior. In such processing, the present invention can be applied to the case where an output unit is supplied with information including programs from storage media such as a CD-ROM, a flash memory, and a FD, or from an external storage medium via a network.

In addition, by providing to a system or apparatus a storage medium containing software for enabling the above-described functions in the foregoing embodiments, and causing a computer (CPU or MPU) for the system or apparatus to read and execute a program code stored in the storage medium, the foregoing object of the present invention can be achieved.

In such a case, the program code itself read from the storage medium realizes the functions according to the present invention, and the storage medium containing the program code constitutes the present invention.

Floppy discs, hard disks, optical discs, magneto-optical discs, CD-ROMs, CD-Rs, magnetic tapes, nonvolatile memory cards, read-only memories, and electrically erasable programmable read-only memories are used as storage media for supplying program codes.

According to the present invention, by executing a program read by a computer, the above-described functions in the foregoing embodiments are realized. The present invention also includes a case in which an OS operating in a computer executes based on instructions from the program code, part or the whole of actual processing, whereby the processing realizes the above-described functions in the foregoing embodiments.

Moreover, according to the present invention, after a program code read from a storage medium is written in a memory provided for an add-in board set in a computer, or an add-in unit connected to a computer, a CPU, etc., executes based on instructions from the program code, part or the whole of actual processing, whereby the processing realizes the above-described functions in the foregoing embodiments.

What is claimed is:

1. A print control apparatus for transforming, in accordance with different print modes, graphics commands from an application into print control commands to be analyzed by a printer before transferring the print control commands via a predetermined communication medium, said print control apparatus comprising:

acquisition means for acquiring transformation-time coefficient data for the print modes;

computation means for computing in units of pages, based on the transformation-time coefficient data acquired by said acquisition means, transformation periods for transforming the graphics commands from the application;

selecting means for selecting one print mode for each page which has the least transformation period by comparing the transformation periods for the print modes computed by said computation means;

determination means for determining whether or not the selected one print mode for each page is identical to a set print mode; and changing means for changing said set print mode into the selected one print mode based on the determination by said determination means when a print control command for each page is generated.

2. A print control apparatus according to claim 1, further comprising: first setting means for setting a layout print mode in which print pages are reduced in size to be arranged on one page, wherein when the layout print mode is set by said first setting means, said computation means computes and totals in units of physical pages each including reduced pages, based on the transformation-time coefficient data acquired for the print pages by said acquisition means, the transformation periods for transforming the graphics commands for the application.

3. A print control apparatus according to claim 1, further comprising: second setting means for setting a two-sided-layout print mode in which print pages are reduced in size to be arranged on one page as the front or back surface of a recording medium, wherein when the two-sided-layout print mode is set by said second setting means, said computation means computes and totals in units of front-surface or back-surface pages, based on the transformation-time coefficient data acquired for each of the print pages by said acquisition means, said transformation periods for transforming the graphics commands for the application.

4. A print control apparatus according to claim 1, wherein different print modes include a vector graphics print mode and a raster graphics print mode.

5. A print control method for transforming, in accordance with different print modes, graphics commands from an application into print control commands to be analyzed by a printer before transferring the print control commands via a predetermined communication medium, said print control method comprising:

an acquisition step for acquiring transformation-time coefficient data for the print modes;

a computation step for computing in units of pages, based on the transformation-time coefficient data acquired in said acquisition step, transformation periods for transforming the graphics commands from the application;

a selecting step for selecting one print mode for each page which has the least transformation period by comparing the transformation periods for the print modes computed in said computation step;

a determination step for determining whether or not the selected one print mode for each page is identical to a set print mode; and a changing step for changing said set print mode into the selected one print mode, based on the determination by said determination step when a print control command for each page is generated.

6. A print control method for transforming, in accordance with different print modes graphics commands from an application into print control commands to be analyzed by a printer before transferring the print control commands via a predetermined communication medium, said print control method comprising:

an acquisition step for acquiring transformation-time coefficient data for each print mode;

a first determination step for determining whether or not a layout print mode in which print pages are reduced in size to be arranged in one page is set;

a computation step for computing and totaling in units of physical pages each including reduced pages, based on each transformation-time coefficient data acquired in said acquisition step, transformation periods for transforming the graphics commands when said first determination step has determined that the layout print mode is set;

a selecting step for selecting one print mode for each page which has the least transformation period by comparing the transformation periods for the print modes computed in said computation step;

a second determination step for determining whether or not the print mode for each page selected in said selecting step is identical to a set print mode; and a changing step for changing the set print mode into the one print mode selected in said selecting step, based on the determination by said second determination step when a print control command for each print mode is generated.

7. A print control method for transforming, in accordance with different print modes, graphics commands from an application into print control commands to be analyzed by a printer before transferring the print control commands via a predetermined communication medium, said print control method comprising:

an acquisition step for acquiring transformation-time coefficient data for each print mode;

a first determination step for determining whether or not a two-sided-layout print mode in which print pages are reduced in size to be arranged in one page as the front surface and back surface of a recording medium is set;

a computation step for computing and totaling in units of front-surface or back-surface pages, based on the transformation-time coefficient data acquired for each print page in said acquisition step, transformation periods for transforming the graphics commands for the application when said first determination step has determined that the two-sided-layout print mode is set;

a selecting step for selecting one print mode for each page which has the least transformation period by comparing the transformation periods for the print modes computed in said computation step;

a determination step for determining whether or not the print mode for each page selected in said selecting step is identical to a set print mode; and a changing step for changing the set print mode into the one print mode selected in said selecting step, based on the determination by said determination step when a print control command for each page is generated.

8. A storage medium containing machine-readable programs for controlling a data processing apparatus in which graphics commands from an application are transformed in accordance with different print modes into print control commands to be analyzed by a printer, and the print control commands are transferred via a predetermined communication medium, the programs each causing the data processing apparatus to perform the following steps:

an acquisition step for acquiring transformation-time coefficient data for each print mode;

a computation step for computing in units of pages, based on the transformation-time coefficient data acquired in said acquisition step, transformation periods for transforming the graphics commands from the application;

a selecting step for selecting one print mode for each page which has the least transformation period by comparing the transformation periods for the print modes computed in said computation step;

a determination step for determining whether or not the selected one print mode for each page is identical to a set print mode; and a changing step for changing said set print mode into the selected one print mode based on the determination by said determination step when a print control command for each page is generated.

9. A storage medium containing machine-readable programs for controlling a data processing apparatus in which graphics commands from an application are transformed in accordance with different print modes into print control commands to be analyzed by a printer, and the print control commands are transferred via a predetermined communication medium, the programs each causing the data processing apparatus to perform the following steps:

an acquisition step for acquiring transformation-time coefficient data for each print mode;

a first determination step for determining whether or not a layout print mode in which print pages are reduced in size to be arranged in one page is set;

a computation step for computing the totaling in units of physical pages each including reduced pages, based on the transformation-time coefficient data acquired in said acquisition step, transformation periods for transforming the graphics commands when said first determination step has determined that the layout print mode is set;

a selecting step for selecting one print mode for each page which has the least transformation period by comparing the transformation periods for the print modes computed in said computation step;

a second determination step for determining whether or not the print mode for each page selected in said selecting step is identical to a set print mode; and a changing step for changing the set print mode into the one print mode selected in said selecting step, based on the determination by said second determination step when a print control command for each print mode is generated.

10. A storage medium containing machine-readable programs for controlling a data processing apparatus in which graphics commands from an application are transformed in accordance with different print modes into print control commands to be analyzed by a printer, and the print control commands are transferred via a predetermined communication medium, the programs each causing the data processing apparatus to perform the following steps:

an acquisition step for acquiring transformation-time coefficient data for each print mode;

a first determination step for determining whether or not a two-sided-layout print mode in which print pages are reduced in size to be arranged in one page as the front surface and back surface of a recording medium is set;

a computation step for computing and totaling in units of front-surface or back-surface pages, based on the transformation-time coefficient data acquired for each print page in said acquisition step, transformation periods for transforming the graphics commands for the application when said first determination step has determined that the two-sided-layout print mode is set;

a selecting step for selecting one print mode for each page which has the least transformation period by comparing the transformation periods for the print modes computed in said computation step;

a determination step for determining whether or not the print mode for each page selected in the selecting step is identical to a set print mode; and a changing step for changing the set print mode into the one print mode selected in said selecting step, based on the determination by said determination step when a print control command for each page is generated.

11. A print control apparatus for generating, in accordance with different print modes, print data to be analyzed by a printer based on graphics commands from an application, said print control apparatus comprising:

spooling means for spooling intermediate data in a spool file, the intermediate data being converted from the graphics commands from the application;

computation means for computing a print process time for each page of the intermediate data spooled by said spooling means;

selecting means for selecting one print mode for each page of the intermediate data from a plurality of print modes based on the print process time computed by said computing means; and generating means for generating print data from the intermediate data spooled in the spool file in accordance with the selected print mode for each page of the intermediate data.

12. A print control apparatus according to claim 11, further comprising:

first setting means for setting a layout print mode in which a plurality of logic pages are reduced in size to be arranged in one page, wherein when the layout mode is set by said first setting means, said computation means computes a primary print process time for each logic page of the intermediate data spooled by said spooling means, and computes the print process time of each page by adding the primary process time of each of the plurality of logic pages to be arranged on the page.

13. A print control apparatus according to claim 11, further comprising:

second setting means for setting a two-sided-layout mode in which a plurality of logic pages are reduced in size to be arranged in one page on both sides of a recording medium, wherein when the two-sided-layout mode is set by said second setting means, said computation means computes a primary print process time for each logic page of the intermediate data spooled by said spooling means, and computes the print process time of each page by adding the primary print process time of each of the plurality of logic pages to be arranged on the page.

14. A print control apparatus according to claim 11, wherein the different print modes include a verctor-graphics print mode and a raster-graphics print mode.

15. A print control method for generating, in accordance with different print modes, print data to be analyzed by a printer based on graphics commands from an application, said print control method comprising:

a spooling step for spooling intermediate data in a spool file, the intermediate data being converted from the graphics commands from the application;

a computation step for computing a print process time for each page of the intermediate data spooled in said spooling step;

a selection step for selecting one print mode for each page of the intermediate data spooled in said spooling step;

a selection step for selecting one print mode for each page of the intermediate data from a plurality of print modes based on the print process time computed in said computing step; and a generation step for generating print data from the intermediate data spooling in the spool file in accordance with the selected print mode for each page of the intermediate data.

16. A print control method according to claim 15, further comprising:

a first setting step for setting a layout print mode in which a plurality of logic pages are reduced in size to be arranged in one page, wherein when the layout mode is set in said first setting step, said computation step further comprises a primary print process time for each logic page of the intermediate data spooled in said spooling step, and computing the print process time of each page by adding the primary print process time of each of the plurality of logic pages to be determined on the page.

17. A print control method according to claim 15, further comprising:

a second setting step for setting a two-sided-layout mode in which a plurality of logic pages are reduced in size to be arranged in one page on both sides of a recording medium, wherein when the two-sided-layout mode is set by said second setting step, said computation step further comprises computing a primary print process time for each logic page of the intermediate data spooled in said spooling step, and computing the print process time of each page by adding the primary print process time of each of the plurality of logic pages to be arranged on the page.

18. A print control method according to claim 15, wherein the different print modes include a vector-graphics print mode and a raster-graphics print mode.

19. A storage medium containing machine-readable programs for controlling a print control apparatus for generating, in accordance with different print modes, print data to be analyzed by a printer based on graphics commands from an application, the programs comprising the steps of:

a spooling step for spooling intermediate data in a spool file, the intermediate data being converted from the graphics commands from the application;

a computation step for computing a print process time for each page of the intermediate data spooled in said spooling step;

a selection step for selecting one print mode for each page of the intermediate data from a plurality of print modes based on the print process time computed is said computing step; and a generation step for generating print data from the intermediate data spooled in the spool file in accordance with the selected print mode for each page of the intermediate data.

20. A storage medium according to claim 19, the programs further comprising the steps of:

a first setting step for setting a layout print mode in which a plurality of logic pages are reduced in size to be arranged in one page, wherein when the layout is set in said first setting step, said computation step further comprises a primary print process time for each logic page of the intermediate data spooled in said spooling step, and computing the print process time of each page by adding the primary print process time of each of the plurality of logic pages to be arranged on the page.

21. A storage medium according to claim 19, the programs further comprising the step of:

a second setting step for setting a two-sided-layout mode in which a plurality of logic pages are reduced in size to be arranged in one page on both sides of a recording medium, wherein when the two-sided-layout mode is set by said second settig step, said computation step further comprises computing a primary print process time for each logic page of the intermediate data spooled in said spooling step, and computing the print process time of each page by adding the primary print process time of each of the plurality of logic pages to be arranged on the page.

22. A storage medium according to claim 19, wherein the different print modes include a vector-graphics print mode and a raster-graphics print mode.

23. A computer program product comprising a computer readable medium having computer program codes for controlling a print control apparatus for generating, in accordance with different print modes, print data to be analyzed by a printer based on graphics commands from an application, said computer program product comprising:

spooling procedure codes for spooling intermediate data in a spool file, the intermediate data being converted from the graphics commands from the application;

computation procedure codes for computing a print process time for each page of the intermediate data spooled by said spooling procedure codes;

selecting procedure codes for selecting one print mode for each page of the intermediate data from a plurality of print modes based on the print process time computed by said computing procedure codes; and generating procedure codes for generating print data from the intermediate data spooled in the spool file in accordance with the selected print mode for each page of the intermediate data.

24. A computer program product according to claim 23, further comprising:

first setting procedure codes for setting a layout print mode in which a plurality of logic pages a reduced in size to be arranged in one page, wherein when the layout mode is set by said first setting means, said computation procedure codes further comprise codes for computing a primary print process time for each logic page of the intermediate data spooled by said spooling procedure codes, and computing the print process time of each page by adding the primary print process time of each of the plurality of logic pages to be arranged on the page.

25. A computer program product according to claim 23, further comprising:

second setting procedure codes for setting a two-sided-layout mode in which a plurality of print pages are reduced in size to be arranged in one page on both sides of a recording medium, wherein when the two-sided-layout mode is set by said second setting means, said computation procedure codes further comprise codes for computing a primary print process time for each logic page of the intermediate data spooled by said spooling procedure codes, and computing the print process time of each page by adding the primary print process time of each of the plurality of logic pages to be arranged on the page.

26. A computer program product according to claim 23, wherein the different print modes include a vector-graphics print mode and a raster-graphics print mode.

27. A print control apparatus for generating, in accordance with different print modes, print data to be analyzed by a printer based on graphics commands from an application, said print control apparatus comprising:

spooling means for spooling intermediate data in a spool file, the intermediate data being converted from the graphics commands from the application;

determination means for determining whether or not a layout mode in which a plurality of logic pages are reduced in size to be arranged in one page is set;

selecting means for selecting one print mode for each page to be printed from a plurality of print modes by judging a load of the plurality of logic pages of the intermediate data to be arranged in one page when said determination means determines that the layout print mode is set; and generating means for generating print data from the intermediate data spooled in the spool file in accordance with the selected print mode for each page.

28. A print control apparatus according to claim 27, futher comprising:

computation means for computing a print process time for each page of the intermediate data spooled by said spooling means, wherein said selecting means selects one print mode for each page from a plurality of print modes based on the print process time of the intermediate data computed by said computation means.

29. A print control method for generating, in accordance with different print modes, print data to be analyzed by a printer based on graphics commands from an application, said print control method comprising:

a spooling step for spooling intermediate data in a spool file, the intermediate data being converted from the graphics commands from the application;

a determination step for determining whether or not a layout mode in which a plurality of logic pages are reduced in size to be arranged in one page is set;

a selecting step for selecting one print mode for each page to be printed from a plurality of print modes by judging a load of the plurality of logic pages of the intermediate data to be arranged in one page when it is determined in said determination step that the layout print mode is set; and a generating step for generating print data from the intermediate data spooled in the spool file in accordance with the selected print mode for each page.

30. A print control method according to claim 29, further comprising:

a computation step for computing a print process time for each page of the intermediate data spooled by said spooling means;

wherein said selecting step comprises selecting one print mode for each page from a plurality of print modes based on the print process time of the intermediate data computed in said computation step.

31. A storage medium containing machine-readable programs for controlling a print control apparatus for generating, in accordance with different print modes, print data to be analyzed by a printer based on graphics commands from an application, the programs comprising the steps of:

a spooling step for spooling intermediate data in a spool file, the intermediate data being converted from the graphics commands from the application;

a determination step for determining whether or not a layout mode in which a plurality of logic pages are reduced in size to be arranged in one page is set;

a selecting step for selecting one print mode for each page to be printed from a plurality of print modes by judging a load of the plurality of logic pages of the intermediate data to be arranged in one page when it is determined in said determination step that the layout print mode is set; and a generating step for generating print data from the intermediate data spooled in the spool file in accordance with the selected print mode for each page.

32. A storage medium according to claim 31, the programs further comprising the steps of:

a computation step for computing a print process time for each page of the intermediate data spooled by said spooling means, wherein said selecting step comprises selecting one print mode for each page from a plurality of print modes based on the print process time of the intermediate data computed in said computation step.

33. A computer program product comprising a computer readable medium having computer program codes for controlling a print control apparatus for generating, in accordance with different print modes, print data to be analyzed by a printer based on graphics commands from an application, said computer program product comprising:

spooling procedure codes for spooling intermediate data in a spool file, the imtermediate data being converted from the graphics commands from the application;

determination procedure codes for determining whether or not a layout mode in which a plurality of logic pages are reduced in size to be arranged in one page is set;

selecting procedure codes for selecting one print mode for each page to be printed from a plurality of print modes by judging a load of the plurality of logic pages of the intermediate data to be arranged in one page when it is determined by said determination procedure codes that the layout print mode is set; and generating procedure codes for generating print data from the intermediate data spooled in the spool file in accordance with the selected print mode for each page.

34. A computer program product according to claim 33, the programs further comprising the steps of:

computation procedure codes for computing a print process time for each page of the intermediate data spooled by said spooling procedure codes wherein said selecting procedure codes comprise selecting one print mode for each page from a plurality of print modes based on the print process time of the intermediate data computed in said computation procedure codes.

* * * * *

UNITED STATES PATENT AND TRADEMARK OFFICE
CERTIFICATE OF CORRECTION

PATENT NO. : 6,493,099 B2
DATED : December 10, 2002
INVENTOR(S) : Koji Nakagiri

It is certified that error appears in the above-identified patent and that said Letters Patent is hereby corrected as shown below:

Column 12,
Line 18, "Under-the" should read -- Under the --.

Column 23,
Line 6, "is" should read -- in --;
Line 32, "settig" should read -- setting --; and
Line 66, "a" (second occurrence) should read -- are --.

Column 24,
Line 46, "futher" should read -- further --.

Signed and Sealed this

Seventh Day of October, 2003

JAMES E. ROGAN
*Director of the United States Patent and Trademark Office*